United States Patent [19]

Hamalainen

[11] Patent Number: 4,525,750
[45] Date of Patent: Jun. 25, 1985

[54] AUTOMATIC TRACKING SYSTEM FOR MULTITRACK RECORDERS

[75] Inventor: Kaarlo J. Hamalainen, Marlton, N.J.
[73] Assignee: RCA Corporation, Princeton, N.J.
[21] Appl. No.: 416,542
[22] Filed: Sep. 10, 1982
[51] Int. Cl.³ .................... G11B 21/10; H04N 5/782; H04N 9/00
[52] U.S. Cl. .................... 358/327; 360/22; 360/77
[58] Field of Search .............. 360/70, 75, 77, 78, 360/DIG. 1, 38.1, 22; 358/310, 315, 327

[56] References Cited

U.S. PATENT DOCUMENTS

| | | | |
|---|---|---|---|
| 3,234,323 | 2/1966 | Kihara | 360/22 X |
| 3,925,816 | 12/1975 | Kihara | 360/66 X |
| 4,148,083 | 4/1979 | Watanabe | 360/77 |
| 4,165,523 | 8/1979 | Hathaway | 360/77 |
| 4,419,687 | 12/1983 | Dischert et al. | 358/310 |

FOREIGN PATENT DOCUMENTS

| | | | |
|---|---|---|---|
| 52-71212 | 6/1977 | Japan | 360/75 |
| 56-119973 | 9/1981 | Japan | 360/77 |
| 56-140522 | 12/1981 | Japan | 360/77 |

Primary Examiner—Raymond F. Cardillo, Jr.
Assistant Examiner—Steven R. Garland
Attorney, Agent, or Firm—Eugene M. Whitacre; Peter M. Emanuel; Henry I. Steckler

[57] ABSTRACT

An automatic tracking system for a VTR has playback heads having widths smaller than the recorded track widths. At least two tracks are simultaneously reproduced. If mistracking occurs, the amplitude of the reproduced signal from one head decreases, while the amplitude of the signal from the other head remains constant. This is detected and used to generate a bimorph control signal to correct the tracking.

5 Claims, 2 Drawing Figures

AUTOMATIC TRACKING SYSTEM FOR MULTITRACK RECORDERS

BACKGROUND OF THE INVENTION

The present invention relates to a VTR (video tape recorder), and more particularly, to automatic tracking arrangements for such a VTR.

In helical scan VTRs a magnetic tape having recorded tracks is displaced around a drum. Within the drum is a headwheel containing magnetic reproducing heads. The reproducing heads must "track" (stay aligned with) the recorded tracks in order to obtain sufficient amplitude for proper reproduction of the recorded signal. However, without some kind of tracking system, tracking errors occur. Most common types of errors for helical scan VTRs are related to the rotation (scanning) rate of the headwheel, which is 60 Hz for an NTSC recorded signal. In particular, tracking errors occur at said rotation rate and harmonics thereof, e.g. 60 Hz, 120 Hz, etc., with 360 Hz being about the highest harmonic at which significant errors occur.

A prior art method for controlling tracking errors has the reproducing heads mounted on a bimorph, which in turn is attached to the headwheel, and an oscillating "dither" signal applied to the bimorph to "dither" the heads. If a tracking error occurs, phase and amplitude changes in the reproduced signal are produced, which changes can be detected to provide information as to the direction and magnitude of the error. From this information a tracking control signal is generated and applied to the bimorph to ensure tracking.

In accordance with the Nyquist sampling criteria, the frequency of the dither signal must be at least twice the highest significant tracking error frequency, i.e. 720 Hz, if the highest significant error frequency is 360 Hz. Preferably the dither frequency is about three times said error frequency, i.e. 1080 Hz in the assumed example. However, this is in the range of the mechanical resonance frequency of the heads and associated mountings, which typically is from 500 Hz to 1200 Hz. Thus the dither signal may cause uncontrolled head vibrations, thereby making controlled tracking difficult.

An additional disadvantage of the dither technique is that in the normal tracking mode, the playback head at least partially leaves the recorded track, thereby periodically reducing the carrier signal level and decreasing the carrier-to-noise ratio.

It is therefore desirable to provide a highly controllable tracking system, in particular one that does not make use of a dither signal.

SUMMARY OF THE INVENTION

Method and apparatus for tracking a multitrack recorded signal, comprising reproducing at least two recorded signals from respective tracks using magnetic heads mounted on a bimorph, said heads having a width smaller than the recorded track width, detecting the reproduced signals, comparing the detected signals, and applying the compared signals to said bimorph to control the position thereof.

DETAILED DESCRIPTION

Figure 1:
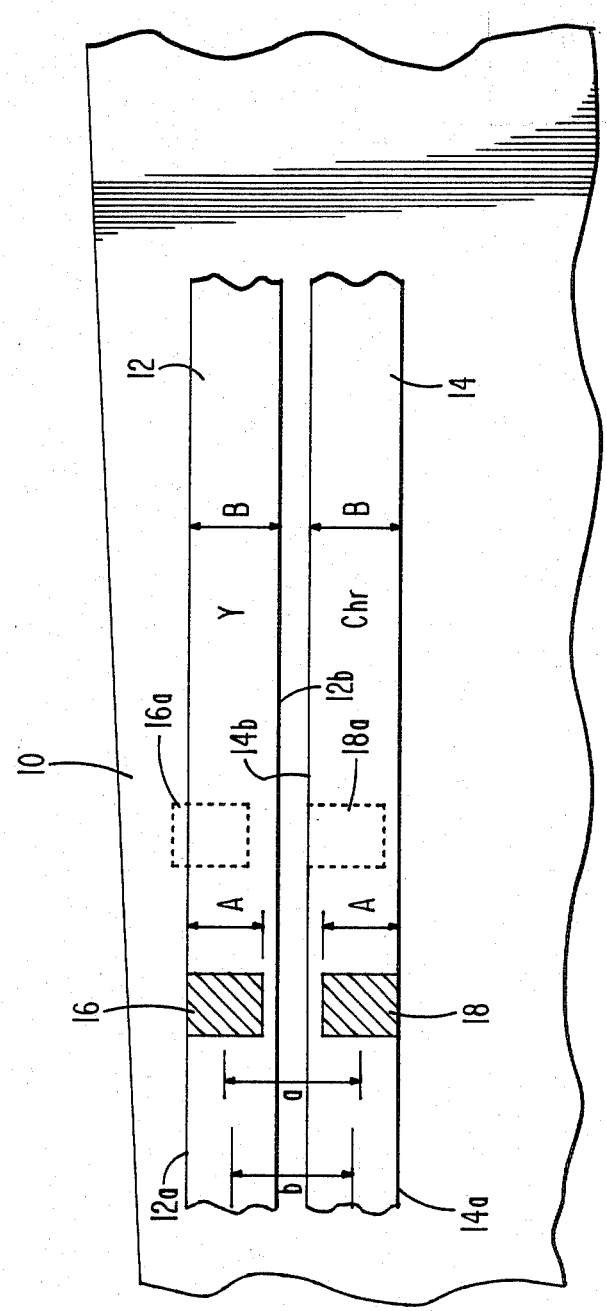
FIG. 1 shows a segment of a prerecorded video tape.

FIG. 1 shows a segment of a tape 10 having prerecorded parallel tracks thereon, only two of which, 12 and 14, are shown. Tracks 12 and 14 typically form an angle of about 2 degrees 34 minutes with the longitudinal edge of tape 10 if recorded using SMPTE type-C format, and for purposes of discussion will be assumed to contain FM analog Y (luminance) and Chr (chroma) signals respectively. Other types of recorded signals, such as digital signals, or formats, such as when both channels contain Y and Chr signals, can be used. A format which meets both of said conditions is shown in U.S. patent application Ser. No. 276,958, filed June 24, 1981, in the name of R. A. Dischert and C. B. Oakley, now U.S. Pat. No. 4,419,687, which is assigned to the assignee of the present invention. In general, the invention is applicable to any type of format in which at least two tracks are simultaneously reproduced.

Also shown in FIG. 1 are the position of two reproducing heads 16 and 18 with respect to tracks 12 and 14 respectively. It is noted that the width "A" of heads 16 and 18 is less than the width "B" of tracks 12 and 14, typically A being 85 percent of B, and also that the center-to-center spacing "a" of heads 16 and 18 is greater than the center-to-center spacing "b" of tracks 12 and 14, i.e. the outer edges of heads 16 and 18 are aligned with outer track edges 12a and 14a respectively. Thus, if heads 16 and 18 start mistracking, such as in an upwards direction as shown by dotted lines in FIG. 1 and indicated by reference numerals 16a and 18a respectively, the output signal amplitude from head 16 is reduced, while that from head 18 remains the same. Conversely, if there is a downward mistracking (not shown), the output signal amplitude from head 16 remains the same, while that from head 18 is reduced. If head center-to-center spacing "a" is chosen to be less than track center-to-center spacing "b", i.e. the inner edges of heads 16 and 18 are aligned with inner track edges 12b and 14b respectively, then the above-described amplitude reduction would be reversed for a given direction of mistracking.

Figure 2:
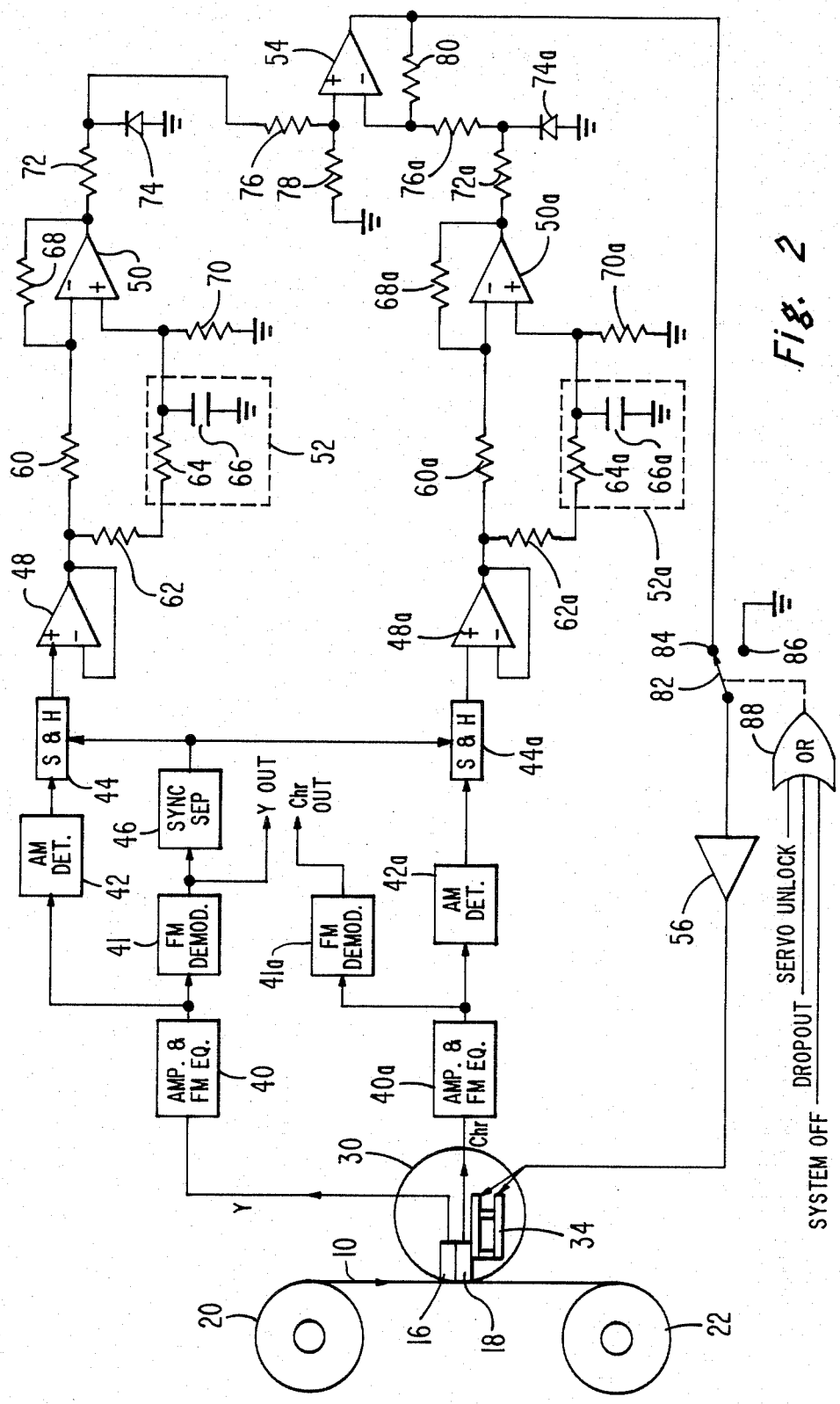
FIG. 2 shows partly a symbolic mechanical representation and partly a block diagram of a circuit in accordance with the invention.

FIG. 2 shows the circuitry and mechanical portions of the invention and conventionally includes a tape transport system in which the tape travels between supply and take-up reels 20 and 22 respectively at a velocity determined by a capstan (not shown) in a tape drive system that is controlled by a capstan servo (not shown). The tape is helically scanned as it moves past heads 16 and 18 disposed in a rotating drum or scanner 30 that is controlled by a drum servo (not shown). Heads 16 and 18 are affixed to a bimorph element 34, which element is mounted on drum 30.

The channels for the Y and Chr signals are substantially identical, and therefore only the Y channel will be described. Corresponding elements of the Chr channel have the same reference numerals with the suffix "a" added. Two chroma signals may be time-compressed and multiplexed onto the Chr channel, which may have a narrower bandwidth than the Y channel. The Y signal from head 16 is applied to amplifier and FM equalizer 40, which equalizes the reproduced signal for the FM recording and playback frequency characteristics as is known in the art. The thus equalized signal is applied to FM demodulator 41, and to AM peak detector 42, which peak detector has a time constant of about 2 ms. (milliseconds) so as to hold the peak signal during the gap in the vertical interval when no reproduced signal is present, which occurs if SMPTE type-C format is used and during any other gaps caused by dropouts which may occur. The peak detected signal from detector 42 is applied to sample-and-hold circuit 44, which has a similar time constant for the same reasons. The demodulated signal from demodulator 41 is applied to sync (synchronization) separator 46 and also provides the reproduced Y signal for further processing as is known in the art. Analogously demodulator 41 provides the Chr signal. The sync signal is derived from the Y channel rather than the Chr channel since its bandwidth is greater, and therefore more accurate pulse edges are obtainable.

Separator 46 provides horizontal sync signals to sample-and-hold circuits 44 and 44a to act as sampling signals for the peak detected signals. The output of circuit 44 is applied to voltage follower 48 which has a high input impedance and a low output impedance. The output of follower 48 is applied through resistor 60 to the inverting input of comparator 50 and through resistor 62, equal in value to resistor 60, to LPF (low pass filter) 52 comprising resistor 64 and capacitor 66. The signal from LPF 52 is applied to shunt resistor 70 and to the non-inverting input of comparator 50. Feedback resistor 68 has the same value as shunt resistor 70 for proper operation of comparator 50. LPF 52 has a time constant of about 200 ms., which corresponds to several revolutions of drum 30. Therefore the output signal of LPF 52 is hereinafter referred to as the "average signal", while the signal at the inverting input is hereinafter referred to as the "instantaneous signal", since this later signal has been subjected to much smaller time total constants (by a factor of 100) in detector 42 and sample-and-hold circuit 44 as described above.

The output signal from comparator 50 is applied to a current limiting resistor 72 for protection of comparator 50 and then to diode 74. As explained below, the output voltage from comparator 50 is zero when proper tracking is occurring and positive otherwise. If a negative output voltage is present, then improper sampling is occurring, and diode 74 prevents this negative voltage from being applied to the remainder of the circuit. The thus clamped output signal is applied to resistor 76, which has the same value as resistor 76a, which resistors determined the overall gain of the circuit of the invention. The signals from resistors 76 and 76a are respectively applied to the non-inverting and inverting inputs of comparator 54. Shunt resistor 78 has the same value as feedback resistor 80.

The resulting difference signal from the output of comparator 54 is applied to switch 82, which generally is in the position shown, i.e., engaging contact 84. Thus the difference signal is applied to amplifier 56, which in turn drives bimorph 34 to cause deflection thereof. If however either the tape or headwheel servos are unlocked, or a dropout is detected (by means not shown, but known in the art), or the system is off, then appropriate signals are received by OR gate 88 and applied as a control signal to switch 82 to cause it to engage contact 86, thereby grounding the input of amplifier 56 and disconnecting the feedback control signal to the drive amplifier 56 from comparator 54.

When heads 16 and 18 are tracking tracks 12 and 14 respectively, the average and instantaneous signals at the inputs of comparators 50a and 50 are equal, and there are no output signals therefrom. Hence there is a zero output signal from comparator 54, and therefore no deflection voltage applied to bimorph 34.

When heads 16 and 18 mistrack in an upward direction as illustrated by dotted lines 16a and 18a in FIG. 1, then the output signal from head 16 and hence the instantaneous signal at comparator 50 falls, while the average signal remains constant for a relatively long time due to LPF 52. Thus the output of comparator 50 rises (becomes more positive). However, the instantaneous signal from head 18 remains a constant, and therefore the output of comparator 50a remains zero. Thus the output signal from comparator 54 rises, and assuming that the VTR is otherwise operating properly so that switch 82 engages contact 84, said output signal causes downwards deflection of bimorph 34, thereby correcting the mistracking in a feedback manner.

It will be appreciated that if a downward mistracking occurs, the output signal from head 18 falls, while that from head 16 remains a constant. Therefore the instantaneous signal at comparator 50a falls, while the average signal remains a constant. Thus the output signal from comparator 50a rises, and since that from comparator 50 remains the same, the output signal from comparator 54 falls. This causes an upward deflection of bimorph 34, again assuming that the VTR is otherwise operating properly.

It will be noted that each of the two comparators 50, 50a compares the signal in its channel and track with the long-term average of the signal in its channel, and not with the instantaneous signal from the other channel. This eliminates the possibility of mistracking which might occur due to differences in the amplitudes of the signals transduced from the Y and Chr tracks. Such instantaneous amplitude differences might occur due to changes in either the frequency or amplitude of the FM carriers by which the signals are recorded in their respective tracks.

Other embodiments of the invention will be apparent to those skilled in the art. For example, several simultaneously recorded tracks may be used as in a digital video recorder with two of the tracks being used for tracking, and therefore having gap widths less than the widths of the recorded tracks, while the remainder of the recorded tracks would be transduced on playback by full-width playback heads for best signal-to-noise performance. In such an arrangement, the tracking heads need not be associated with physically adjacent tracks, and the tracking playback heads may be associated with those tracks carrying the bits of the digital signal having a particular significance (i.e., LSB, MSB or the like). Naturally, adjacent tracks may be azimuth recorded in order to reduce crosstalk.

What is claimed is:

1. An automatic scan tracking system adapted for automatically tracking multiple tracks, at least two of which have a predetermined track width, said automatic scan tracking system comprising:

first transducing means for scanning one of said two tracks having a predetermined track width for transducing first signals therefrom, said first transducing means having a width less than the width of said one of said two tracks;

second transducing means for scanning the other of said two tracks having a predetermined track width for transducing second signals therefrom, said second transducing means having a width less than the width of said other of said two tracks;

first and second averaging means coupled to said first and second transducing means, respectively, for forming first and second long-term average signals from said first and second signals, respectively;

first signal comparison means coupled to said first transducing means and said first averaging means for comparing a substantially instantaneous representation of said first signal with said first long-term average signal to produce a first intermediate signal;

second signal comparison means coupled to said transducing means and said second averaging means for comparing a substantially instantaneous representation of said second signal with said second long-term average signal to produce a second intermediate signal;

controllable position control means coupled to said first and second transducing means for moving said first and second transducing means for altering said scanning paths taken by said first and second transducing means in response to a control signal; and third comparison means coupled to said first and second signal comparison means and to said controllable position control means and responsive to said first and second intermediate signals for generating said control signal for controlling said scanning paths in a feedback manner.

2. Television tape playback apparatus for playing back FM-modulated first color television video signal components from a first elongated prerecorded track of a magnetic tape and for playing back at least second FM-modulated color television video signal components from a second elongated track prerecorded parallel to said first track, said apparatus comprising:

first transducing means adapted for scanning said first track;

second transducing means adapted for scanning said second track;

transducer mounting means mechanically coupled to said first and second transducing means for moving said first and second transducing means as a unit in a direction lateral to the direction of said elongated first and second tracks under the control of a control signal;

first and second FM demodulation means coupled to said first and second transducing means, respectively, for recovering said first and second color television signal components, respectively, said first and second color television signal components being subject to an undesirable degradation if said first and second transducing means mistrack;

first and second AM detection means coupled to said first and second transducing means, respectively, for detecting the amplitudes of said FM-modulated first and second signal components, respectively, to form first and second detected amplitude signals, at least one of said first and second detected amplitude signals being reduced in response to a first direction of mistracking of said first and second transducing means;

control means coupled to said first and second AM detection means and to said transducer mounting means for processing said first and second detected amplitude signals for generating a control signal for controlling said movement to position said first and second transducing means over said first and second tracks, respectively, in a feedback manner, whereby said undesirable degradation is eliminated;

said control means including first averaging means coupled to receive said first detected amplitude signal for forming a first time average signal; second averaging means coupled to receive said second detected amplitude signal for forming a second time average signal; first comparison means coupled to said first AM detection means and to said first averaging means for comparing said first detected amplitude signal with said first time average signal to form a first control signal component; and second comparison means coupled to said second AM detection means and to said second averaging means for comparing said second detected amplitude signals with said second time average signal to form a second control signal component; and difference means coupled to said first and second comparison means for generating said control signal from said first and second control signal components; and coupling means coupled to said first and second FM demodulation means and adapted to be coupled to utilization means for coupling said first and second color television signal components to said utilization means.

3. Apparatus according to claim 2 wherein:

said first transducing means comprises a first magnetic head including a first gap having a width less than the width of said first track;

said second transducing means comprises a second magnetic head including a second gap having a width less than the width of said second track; and said transducer mounting means is mechanically coupled to said first and second transducing means in such a manner that said first and second gaps scan those portions of said first and second tracks, respectively, which are one of adjacent said second and first tracks, respectively, and remote from said second and first tracks, respectively.

4. Television tape playback apparatus for playing back a first FM-modulated television video signal component from a first elongated prerecorded track of a magnetic tape and for playing back at least a second FM-modulated television video signal component representing a different type of information than said first color television video signal component from a second elongated track prerecorded parallel to said first track, said apparatus comprising:

first and second transducing means adapted for scanning said first and second tracks, respectively, at the same time;

transducer mounting means mechanically coupled to said first and second transducing means for moving said first and second transducing means as a unit at the same time in a direction lateral to the direction of said elongated first and second tracks under the control of a control signal;

first and second FM demodulation means coupled to said first and second transducing means, respectively, for recovering said first and second signal components, respectively, at the same time, said first and second signal components being subject to an undesirable degradation if said first and second transducing means mistrack;

first and second AM detection means coupled to said first and second transducing means, respectively, for detecting the amplitudes of said first and second signal components, respectively, to form first and second detected amplitude signals, respectively, at the same time, at least one of said first and second detected amplitude signals being reduced in response to a first direction of mistracking of said first and second transducing means; and control means coupled to said first and second AM detection means and to said transducer mounting means for processing said concurrently produced first and second detected amplitude signals for generating a control signal for controlling said movement to position said first and second transducing means over said first and second tracks, respectively, in a feedback manner whereby said undesirable degradation due to mistracking is reduced.

5. Apparatus according to claim 4, wherein:

said first transducing means comprises a first magnetic head including a first gap having a width less than the width of said first track;

said second transducing means comprises a second magnetic head including a second gap having a width less than the width of said second track; and said transducer mounting means is mechanically coupled to said first and second transducing means in such a manner that said first and second gaps scan those portions of said first and second tracks, respectively, which are one of adjacent said second and first tracks, respectively, and remote from said second and first tracks, respectively.

* * * * *